Aug. 3, 1965 C. F. AUGUSTINE 3,199,103
DISPLACEMENT DETECTOR
Filed Aug. 12, 1959 5 Sheets-Sheet 3
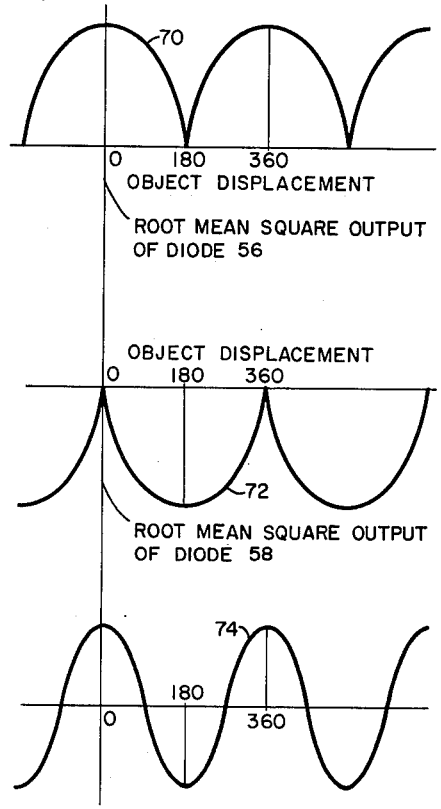
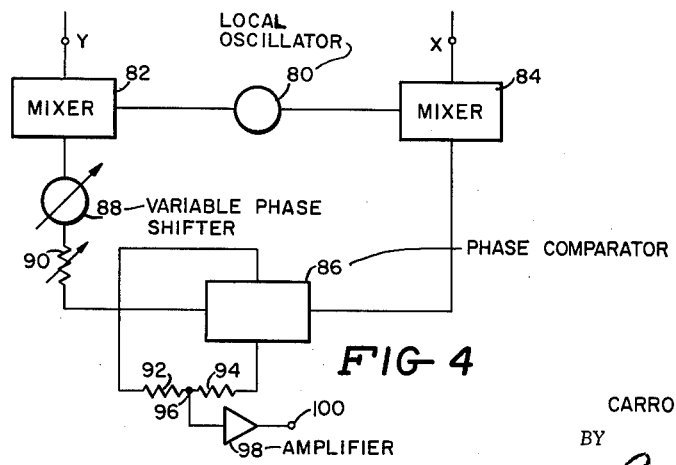
FIG-3
FIG-4
INVENTOR.
CARROLL F. AUGUSTINE
BY
Richard J. Seeger
ATTORNEY INVENTOR.
CARROLL F. AUGUSTINE
BY
*Richard T. Seeger*
ATTORNEY Aug. 3, 1965  C. F. AUGUSTINE  3,199,103
DISPLACEMENT DETECTOR Filed Aug. 12, 1959  5 Sheets-Sheet 5

INVENTOR.
CARROLL F. AUGUSTINE
BY
*Richard J. Seeger*
ATTORNEY

United States Patent Office 3,199,103
Patented Aug. 3, 1965

3,199,103
DISPLACEMENT DETECTOR
Carroll F. Augustine, Farmington, Mich., assignor to The Bendix Corporation, a corporation of Delaware
Filed Aug. 12, 1959, Ser. No. 833,267
9 Claims. (Cl. 343—12)

This invention pertains to a method of displacement detection and a displacement detector which is able to accurately indicate displacements of an object, including displacements irregular in frequency and amplitude, with the detector in no way physically touching the object.

It is an essential purpose of this invention to provide an instrument for measuring object displacements which generates a periodic microwave signal and directs this signal toward a displaced or moving object and then compares the phase of the signal returned by the object with the phase of a generator or reference signal to determine the degree of displacement of the object from a starting point.

It is a purpose of this invention to provide in such an instrument a calibrated phase shifter to determine object displacement by adjusting the phase shifter until a null output is obtained for each object position and then comparing shifter position.

It is a further purpose of this invention to provide in such an instrument an antenna for sending the generated signal and receiving the return signal which has an ellipsoidal reflector and has the antenna feed placed approximately at one focus point of the ellipsoid so that the generated waves are focused at the other focus point of the ellipsoid.

It is a further object to provide in such an instrument a phase comparator which provides two out of phase outputs each of which indicates the phase difference between the generated and return signals, and which adds these outputs to provide an indicating signal which is of higher resolution, of greater usable range, and which balances noise signals against one another to reduce the noise level.

It is another object to provide in such an instrument an electrical path from the generator to the reference input of the phase comparator which has approximately the same envelope delay as the electrical path from the generator to the object or return input of the phase comparator so that noise components are substantially balanced and cancelled.

It is a further object of this invention to heterodyne a local oscillator signal with both the reference input signals and return input signals to the phase comparator to produce a lower intermediate frequency which improves the minimum discernible object displacement.

These and other objects and purposes will be more apparent when preferred embodiments of this invention are described in connection with the drawings, in which:

FIGURE 3 shows two wave forms representing the outputs of the phasing member and their sum;

FIGURE 4 is a schematic, partially block, diagram of a heterodyne phase comparator;

Figure 1:
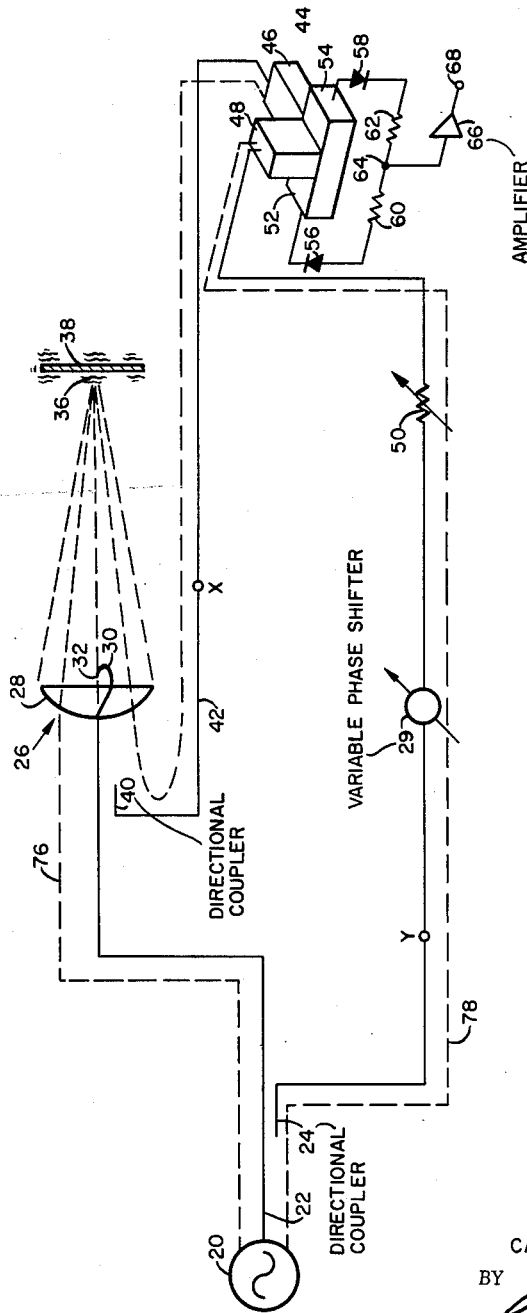
FIGURE 1 is a schematic diagram of a preferred embodiment of this invention.
Figure 2:
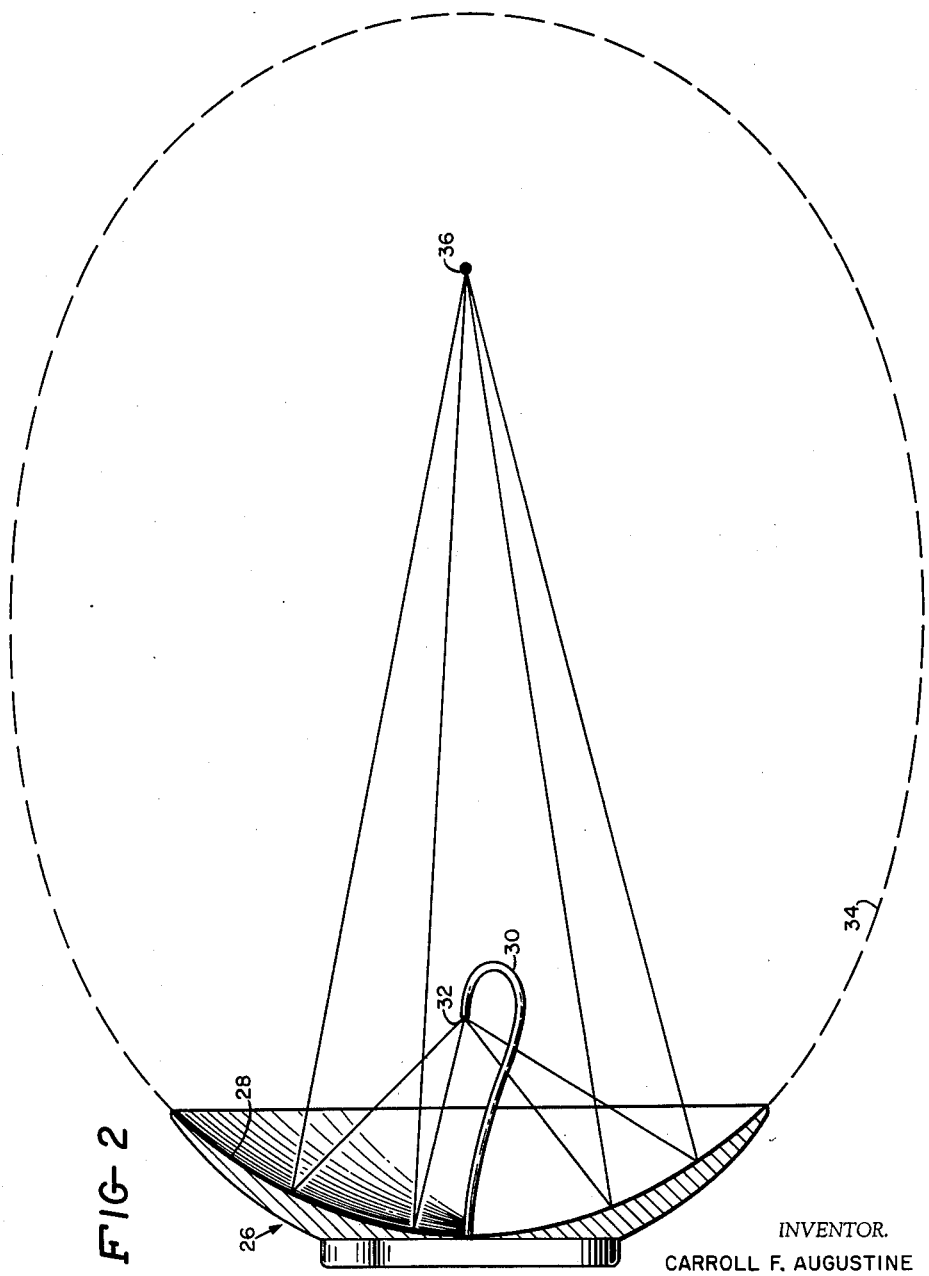
FIGURE 2 is an enlarged, sectional view of the antenna used in the embodiment of FIGURE 1.

Referring now to the drawings and especially FIGURES 1 and 2, a first embodiment of this invention will be described. In FIGURE 1 is shown a klystron 20 which, for a particular use, may generate a signal having a frequency of 55 kilomegacycles which corresponds to a wave length of approximately 2/10 of an inch. Of course, the frequency and resultant wave length can be varied as desired. The generated signal from klystron 20 travels through a line 22 to a directional coupler 24, which may have a coupling factor of 10 decibels to divide the generated signal in a ratio of approximately 10 to 1 to antenna 26 and to phase shifter 29, respectively. The portion of signal going to phase shifter 29 is termed the reference signal and will be discussed at a later point.

Antenna 26

The structure and function of antenna 26 will now be described in connection with FIGURES 1 and 2. Antenna 26 has an ellipsoidal reflector 28 and a "button hook" feed 30 with the end of feed 30 being approximately at focus 32 of the ellipsoid 34, shown in dashed lines. The generated wave leaving feed 30 is directed towards ellipsoidal reflector 28 and the waves incident on reflector 28 characteristically converge at the other focus 36 of the ellipsoid 34. In this manner a concentrated spot is available for focusing on an object 38, the reciprocal motion or displacement of which is to be measured. If the antenna reflector had a predetermined elliptical cross section from one side to the other and if the antenna feed extended along a line connecting the corresponding foci of said ellipsoidal cross sections, then a line focus would be available at the other focus of the elliptical cross sections.

A return signal is reflected from object 38, received by reflector 28, and conducted along the antenna feed line in a reverse direction until it is divided by directional coupler 40. Satisfactory operation is achieved with coupler 40 having a coupling factor of 3 decibels so that about half of the return signal enters a return line 42. Directional couplers 24 and 40 may be of the multi-hole type which are obtainable from the F. R. Machine Works, Inc., Woodside, New York, Model No. M610. The phase of the return signal will vary in proportion to the distance between the antenna and the object, and in this embodiment the wavelength of the generated signal is preferably long enough to include the travel range of the object so that a given phase difference relates to only one displacement.

Phase comparator 44

Line 42 is connected to an input arm 46 of a comparator or phasing member 44 which in this embodiment is a hybrid waveguide junction or magic T. Entering the other input arm 48 of member 44 is the reference signal coming from directional coupler 24. This reference signal first passes through the phase shifter 29 which is used to adjust the phase of the reference signal to agree with the phase of the return or object signal when the object is at zero displacement. The reference signal then enters a variable attenuator 50 which is adjusted until the reference signal amplitude is equal to the amplitude of the return or object signal.

The reference signal forms with the object signal two out of phase combinations in output arms 52, 54 of magic T 44. The reference signal in one combination is always at an angle of 180° to the reference signal in the other combination. This is true since the input arm 48 forms an "E" junction with output arms 52, 54 while input arm 46 forms an "H" junction with output arms 52, 54. Signals entering input arm 46 are divided equally between the output arms with the signals in the output arms being in phase. Signals entering arm 48 are divided equally between output arms 52, 54 but have a phase difference of 180°.

The object and reference signals in output arms 52, 54 respectively are detected in diodes 56, 58, which are oppositely polarized and then are passed respectively to resistors 60, 62. A central tap 64, wherein the sum of the output voltages is present, is connected to an amplifier 66 which in turn is connected to output terminal 68 of an oscillograph, meter, or some other device.

The functions and advantages of the phasing member will be best understood with reference to FIGURE 3. Wave form 70 of FIGURE 3 represents the vectorial combination, with reference to object displacement which is the average root mean square output value of diode 56. Wave form 72 in FIGURE 3 represents the vectorial combination, with reference to object displacement, which is the average root mean square output value of diode 58. Wave forms 70, 72 are of opposite signs since detectors 56, 58 are connected in opposite directions and have a phase difference since the respective $E_r$'s are out of phase. Wave form 74 is the sum of wave forms 70 and 72 and is the voltage at point 64 in FIGURE 1.

With just a single output from member 44 the amplitude noise present would not be reduced and would limit the ultimate resolution obtainable by the system. The linear portions of the curve are increased since the curve is a straight line curve having a greater total amplitude.

These limitations are alleviated by adding to the curve 70 the curve 72 to obtain curve 74. Since curve 70 is positive and 72 is negative, certain noise and other factors tend to cancel out. Also, the linear portions of curve 74 are increased over those in either curves 70, 72, and movements of the object will occur over a greater linear length of the curve.

The greater the displacement of the object 38, the greater the phase difference between signals $E_o$ and $E_r$ and the larger the output amplitude is in accordance with curve 74. Phase shifter 29 is adjusted until a zero point on curve 74 is obtained. Any object movement from the zero point will cause an output corresponding to the sum of curves 70 and 72.

*Equal envelope delays*

Also aiding in noise cancellation is the fact that the envelope delay through path length 76 of the signal from klystron generator 20 through the antenna 28 to the object 38 back to the antenna 28 and then to the input arm 46 of magic T 44 is approximately equal to the envelope delay through path length 78 of the reference signal from klystron 20 to arm 48 of the magic T 44. Low frequency FM noise emanating from the klystron is cancelled in the phase comparator when the envelope delays through the two paths are equal. Envelope delay refers to the time or delay that the klystron output envelope experiences in reaching the phase comparator.

*Operation*

Briefly, the operation of this embodiment is as follows: The klystron 20 generates a high frequency signal which is divided by directional coupler 24 in a ratio of approximately 10 to 1 to antenna 26 and to arm 48 of magic T 44, respectively. The portion of the signal going to arm 44 is the reference signal and has its phase shifted by phase shifter 29 to establish a zero point and is attenuated by attenuator 50 to equal the signal strength of the signal returned from object 38. The portion of the generated signal going to antenna 26 is radiated from the end of antenna feed 30 to the ellipsoidal reflector 28. The end of feed 30 is approximately at one focus 32 of the ellipsoid 34 so that the reflected waves will be focused at the other ellipsoid focus 36. The object 38, which displacement is to be measured, is placed in the vicinity of the focus 36 and reflections from this object will be received by the antenna and will enter line 42 through directional coupler 40 and then will enter input arm 46 of magic T 44. The reference signal $E_r$ differs in phase in the two output arms 52 and 54 by 180°. The reference signals $E_r$ add with the object signals $E_o$ and are detected by oppositely polarized diodes 56 and 58. The sum of the diode outputs is fed to amplifier 66 and then to output terminal 68. The signal at 68 is straight line sinusoidal and has an amplitude that is a function of the object displacement. The greater the displacement of object 38, the greater the phase difference between the object return signal and the reference signal and the greater the amplitude of the output signal.

*Heterodyne phase comparator*

If desired, the phase comparator may take the form of that shown in FIGURE 4 which changes the previous circuit shown in FIGURE 1 by substituting at points X, Y the apparatus shown in FIGURE 4 for that apparatus shown to the right of points X, Y in FIGURE 1. A local oscillator 80 provides a signal which is mixed by mixers 82, 84, respectively, with the reference signal $E_r$ and object signal $E_o$ to provide an intermediate frequency. The mixed signal $E_o$ is fed to one input of a low frequency phase comparator 86 and the mixed reference signal $E_r$ is fed through a phase shifter 88 and variable attenuator 90 to the second input of the comparator 86. The outputs of comparator 86 are fed to resistors 92, 94 where the output signals are added at point 96 and fed to an amplifier 98 and then to output terminal 100. This system provides greater resolution in those cases where it is desired.

Figure 5:
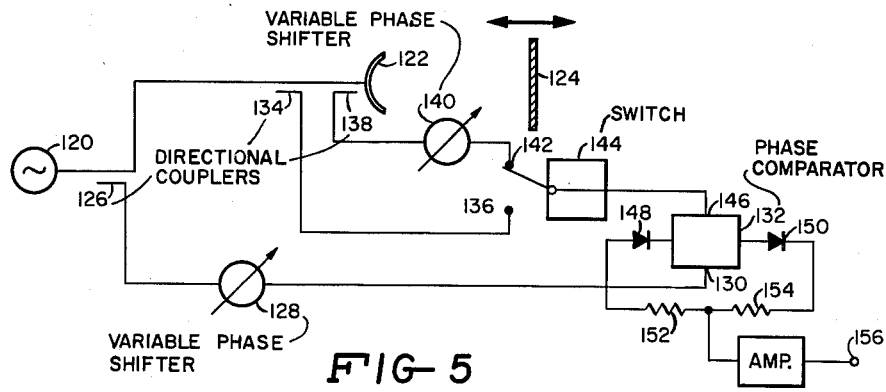
FIGURE 5 is a schematic partially block diagram of a further embodiment of this invention incorporating switching means to provide a desired output frequency.

A further embodiment is shown in FIGURE 5 wherein frequency generator 120 generates a high frequency which is radiated by antenna 122 to an object 124. A directional coupler 126 directs a portion of the generated frequency through a phase shifter 128 to one input 130 of a phase comparator 132. A second directional coupler 134 directs a portion of the transmitted frequency to a terminal 136, and a third directional coupler 138 receives the signal reflected from the object 124 and directs it through a phase shifter 140 to a terminal 142. A switching means 144 makes contact with terminals 136 and 142 at a desired frequency and is connected to the second input 146 of phase comparator 132. Comparator 132 may be similar to and perform the functions of the comparator 44 shown in FIGURE 1.

The outputs of phase comparator 132 are connected respectively to detectors 148 and 150 which detect the signals coming from comparator 132, which signals develop a voltage drop across resistors 152 and 154 and are added at point 156.

In the operation of this embodiment, when object 124 is at an initial position, phase shifters 128 and 140 are adjusted so that the output at 156 is zero or some predetermined voltage level. Then as the object 124 is moved the phase of the reflected signal will vary and this will cause corresponding output at point 156 in the manner hereinbefore described. However, since switch 144 is vibrating at a predetermined frequency, the output at terminal 142 is constantly alternated with the output at terminal 136 so that the output at terminal 156 appears as a square wave at the frequency of switch 144. Hence there is an alternating current output instead of a direct current output and the need for a D.-C. amplifier in the output circuit is eliminated. Also, since the frequency of switch 144 may be varied as desired, the output frequency can be in a region which is at a low noise level for detectors 148 and 150 which may be of the crystal type.

Figure 6:
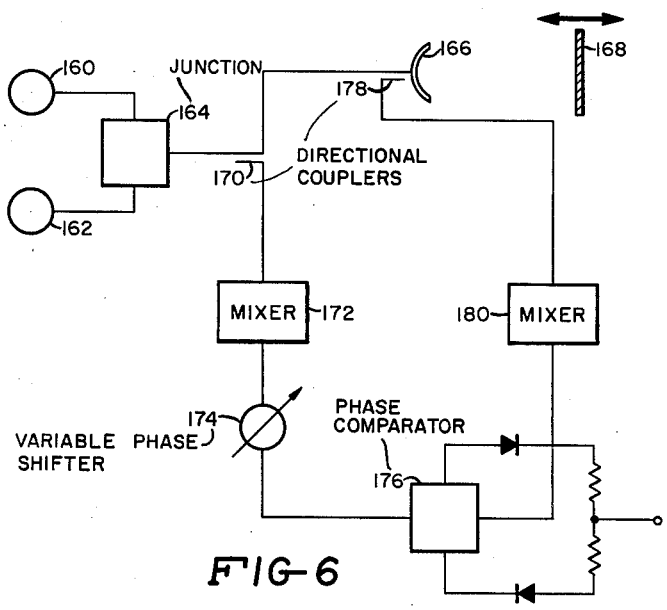
FIGURE 6 is a schematic, partially block, diagram of an embodiment having two high frequency generators.

A further embodiment is shown in FIGURE 6 wherein two frequency generators 160 and 162 are combined at junction 164 and radiated by antenna 166 to object 168.

Directional coupler 170 directs a portion of the signal from junction 164 to a mixer 172 then to a phase shifter 174 and then to one input of a phase comparator 176 which also may be similar to comparator 44 of FIGURE 1. A directional coupler 178 directs a portion of the signal reflected from object 168 and received by antenna 166 to mixer 180 after which the reflected mixed signal is directed to the other input of phase detector 176. The outputs of phase comparator 176 are passed through detectors in the usual manner to an output circuit.

In the operation of this embodiment, the signal generated by sources 160 and 162 differ in frequency by a predetermined amount. These signals are mixed by mixers 172 and 180 so that an intermediate frequency equal to the difference of the signals is directed to the inputs of comparator 176. In this manner very large object displacements may be obtained without exceeding the wavelength of the intermediate frequency. Also, it is easier to establish a stable difference frequency than it is to establish a stable absolute value of either frequency. Also, since operation is at an intermediate frequency, amplitude limiters can more readily be used. These limiters may be placed in the intermediate frequency lines and serve to level amplitude variations going to the phase comparator.

Applications of invention

Figures 7, 8:
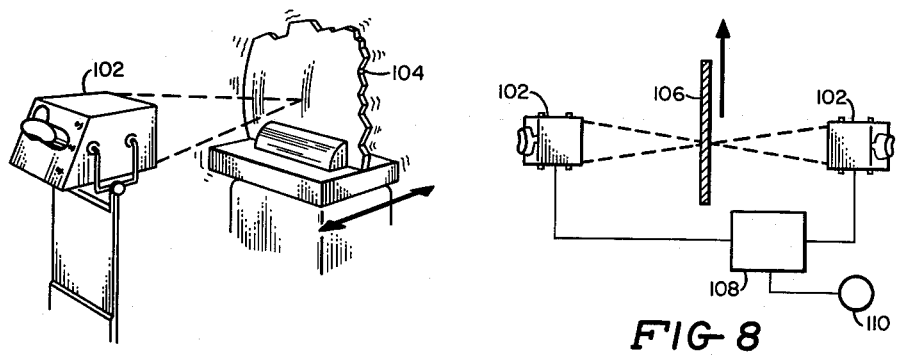
FIGURE 7 is a view in perspective of an embodiment of this invention used to measure high frequency reciprocation motion.
FIGURE 8 is a schematic, partially block diagram of an embodiment of this invention as used for continuous measurement of absolute thickness.
Figure 9:
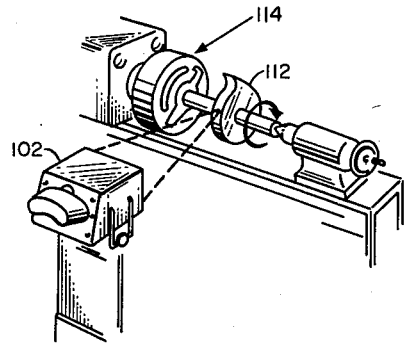
FIGURE 9 is a view in perspective of an embodiment of this invention as used to measure contours at a high revolution rate.

FIGURES 7 to 9 illustrate several of the applications possible of a device of this invention. In FIGURE 7 a displacement detector 102 is shown mounted at a distance from a vibrating object 104. The amplitude and frequency of these vibrations may be accurately detected without any portion of the detector 102 touching the moving object 104.

FIGURE 8 illustrates the use of two detectors 102 focusing on opposite sides of a sheet 106 which is passing therebetween. Each detector continuously measures the distance to the nearer sheet side and this information is fed to a comparison device 108 which indicates the sheet thickness on meter 110.

In FIGURE 9 a displacement detector 102 is shown focused on a part 112 being turned in a lathe 114. The exact conformation of the contour of part 112 may be viewed or recorded through the use of the displacement detector 102. The concentrated microwave beam provided by ellipsoidal antenna 26 is of particular advantage in this application of the invention.

An important advantage and application of this invention is to calibrate phase shifter 29 in desired units of displacement, such as inches, and then adjust it until a null position is indicated at terminal 68 for the initial object position. After displacement of the object, shifter 29 is again adjusted until a null position is reached and the displacement of the object can be read directly from the phase shifter in the desired units without any mechanical reference device.

Other applications include measuring "out of round" of a rotating part, thicknesses of dielectric parts, absolute distance for machine tool positioning and many others.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. A microwave gage for detecting object displacement from a reference position comprising
    a stable microwave frequency source,
    antenna means,
    linear microwave phase comparator means having first and second inputs and an output,
    first directional coupling means connecting said microwave frequency source to the first input of said comparator means for providing a reference signal to said comparator means,
    second directional coupling means coupling said source to said antenna means and coupling the signal reflected by the object received by said antenna means to the second input of said comparator means,
    variable microwave attenuator means in the connection between said first coupling means and said comparator means for controlling the magnitude of said reference signal,
    the output of said linear phase comparator means providing a signal the amplitude of which is proportional to the relative phase difference between the signals applied to said inputs of said linear phase comparator means and hence is proportional to object displacement and the polarity of which indicates the direction of object displacement from said reference position, so that the object displacement in one direction may be indicated as positive and object displacement in the opposite direction may be indicated as negative,
    calibration means to adjust the phase of the reference signal relative the phase of the reflected signal so that the amplitude of the signal at the output of said microwave phase comparator means is a predetermined value when the object is at the reference position.

2. The gage of claim 1 with said linear microwave phase comparator means comprising
    a microwave hybrid junction having two input arms and two output arms,
    the signals in one of said output arms being in fixed phase relation to the signals in the other of said output arms,
    detecting means being connected to one of said output arms to produce only positive value signals and being connected to the other of said output arms to produce only negative value signals,
    summing means for adding the outputs of said detecting means.

3. Apparatus for detecting relative object displacement comprising a klystron tube for generating a high frequency periodic signal, an antenna having an elliptical arc reflector directed towards said object, an antenna feed being located at one of the elliptical arc foci and the object being located at the other of said elliptical arc foci, a magic T having a pair of input arms and a pair of output arms connected so that signals entering the input arms will leave the output arms in different phases, a first and second directional coupler, said first directional coupler connecting said klystron to one input arm of said magic T and connecting said klystron to said antenna, said second directional coupler connecting said antenna to said klystron and connecting said antenna to the other input arm of said magic T, a diode being connected to each output arm of the magic T, said diodes being oppositely polarized, and said diode ends being connected at a summing point.

4. The apparatus of claim 3 being further characterized by a phase shifter being placed between said first directional coupler and said one input arm to said magic T.

5. The apparatus of claim 3 being further characterized by a variable attenuator being placed between said first directional coupler and said one input arm to said magic T.

6. The apparatus of claim 3 being further characterized by the envelope delay between said klystron tube through said first directional coupler and to said one input arm of said magic T being substantially equal to the envelope delay from said klystron through said antenna, to and from said object and through said directional coupler to the other input arm of said magic T to balance and minimize noise.

7. Apparatus for detecting relative object displacement comprising means for generating a periodic signal, signal sending means connected to said generating means for receiving at least a portion of said generated signal and directing it toward the object, signal receiving means for receiving the return signals from said object, phase comparing means for receiving a generated signal fro said generating means at one input and a received signal from said receiving means at a second input and providing a signal corresponding to the phase difference therebetween with the phase change between the generated and received signals indicating the position change relative said object, switching means for connecting to said second input at a predetermined frequency first the received signal from said receiving means and then a portion of the generated signal whereby said output has a frequency corresponding to said predetermined frequency.

8. Apparatus for detecting relative object displacement comprising means for generating a periodic signal, signal sending means connected to said generating means for receiving at least a portion of said generated signal and directing it towards the object, signal receiving means for receiving the return signals from said object, phase comparing means for receiving a generated signal from said generating means at one input and a received signal from said receiving means at a second input and providing a signal corresponding to the phase difference therebetween with a the phase change between the generated and received signals indicating the position change relative said object, switching means for connecting to said second input at a predetermined frequency first the received signal from said receiving means and then a portion of the generated signal whereby said output has a frequency corresponding to said predetermined frequency, a first phase shifter being in this line between said generating means and said first input, and second phase shifter being between said receiving means and said second input of the phase comparator.

9. Apparatus for detecting relative object displacement comprising means for generating a periodic signal, signal sending means connected to said generating means for receiving at least a portion of said generated signal and directing it towards the object, signal receiving means for receiving the return signals from said object, phase comparing means for receiving a generated signal from said generating means at one input and a received signal from said receiving means at a second input and providing a signal corresponding to the phase difference therebetween with the phase change between the generated and received signals indicating the position change relative said object, said generating means generating two signals of different frequency, a first mixer being between said generating means and said first input to said phase comparator and a second mixer being between said receiving means and said second input to said phase comparator.

References Cited by the Examiner
UNITED STATES PATENTS

| | | | |
|---|---|---|---|
| 2,045,072 | 6/36 | Espenschied | 343—12 |
| 2,271,300 | 1/42 | Lindenblad | 343—840 |
| 2,407,057 | 9/46 | Carter | 343—840 |
| 2,537,574 | 1/51 | Crosby | 343—12 |
| 2,641,754 | 6/53 | Clegg | 343—12 |
| 2,714,205 | 7/55 | Grayson et al. | 343—7.7 |
| 2,748,384 | 5/56 | Crone et al. | 343—17.2 |
| 2,755,463 | 7/56 | Richmond | 343—12 |
| 3,003,147 | 10/61 | Lueg et al. | 343—8 |
| 3,076,191 | 1/63 | Williams | 343—7 |

OTHER REFERENCES

Kraus, "Antennas," published by McGraw-Hill Book Co., 1950, pp. 324–325.

Silver, Microwave Antenna Theory and Design (McGraw-Hill; New York), 1949, volume 12 of Radiation Laboratory Series.

CHESTER L. JUSTUS, *Primary Examiner.*

FREDERICK M. STRADER, *Examiner.*